United States Patent
Liu et al.

(10) Patent No.: US 9,743,233 B1
(45) Date of Patent: Aug. 22, 2017

(54) METHOD AND APPARATUS FOR GEO-FENCE MONITORING

(71) Applicant: Marvell International Ltd., Hamilton (BM)

(72) Inventors: BoChih Liu, Shanghai (CN); Zhike Jia, Fremont, CA (US); Jian Chen, Shanghai (CN); Yongsong Wang, Shanghai (CN); Jing Yu, Shanghai (CN)

(73) Assignee: Marvell International Ltd., Hamilton (BM)

( * ) Notice: Subject to any disclaimer, the term of this patent is extended or adjusted under 35 U.S.C. 154(b) by 7 days.

(21) Appl. No.: 14/837,289

(22) Filed: Aug. 27, 2015

Related U.S. Application Data (60) Provisional application No. 62/091,807, filed on Dec. 15, 2014.

(51) Int. Cl.
*H04W 72/00* (2009.01)
*H04W 4/02* (2009.01)
*H04W 64/00* (2009.01)

(52) U.S. Cl.
CPC .......... *H04W 4/021* (2013.01); *H04W 64/00* (2013.01)

(58) Field of Classification Search
CPC .............................. H04W 4/021; H04W 64/00
USPC .......................................... 455/450; 370/338
See application file for complete search history.

(56) References Cited

U.S. PATENT DOCUMENTS

| | | | |
|---|---|---|---|
| 2009/0271111 A1* | 10/2009 | Takanashi | G01C 21/20 701/533 |
| 2012/0072106 A1* | 3/2012 | Han | G01C 21/206 701/410 |
| 2014/0187256 A1* | 7/2014 | Modali | H04W 4/027 455/456.1 |

* cited by examiner

*Primary Examiner* — Marcos Batista (57) ABSTRACT

Aspects of the disclosure include a device for geo-fence monitoring. The device includes a first positioning circuit, a second positioning circuit, and a control circuit. The first positioning circuit is configured to determine a position of the device before becoming inactive. The second positioning circuit is configured to determine an estimated distance that the device travels relative to the position. The control circuit is configured to reactivate the first positioning circuit when the estimated distance exceeds a first predetermined threshold and a difference between a current wireless fingerprint and a previous wireless fingerprint exceeds a second predetermined threshold.

20 Claims, 5 Drawing Sheets

METHOD AND APPARATUS FOR GEO-FENCE MONITORING

INCORPORATION BY REFERENCE

This present disclosure claims the benefit of U.S. Provisional Application No. 62/091,807, "Power Saving Automatic Geofencing Detection within Device" filed on Dec. 15, 2014, which is incorporated herein by reference in its entirety.

FIELD

This disclosure relates generally to activating a positioning circuit for geo-fence monitoring. More specifically, the disclosure relates to apparatus and methods for activating a positioning circuit based on an estimated distance and a wireless fingerprint.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

A geo-fence is a virtual perimeter for defining a real-world geographic area as a geo-fenced area. In some applications, a location-aware device, such as a mobile device or a radio-frequency identification (RFID) device, performs geo-fence monitoring to detect whether the location-aware device enters or exits a geo-fenced area defined by the geo-fence. In some applications, a geo-fenced area may correspond to a geographic area, a building, or a shopping mall. In some applications, a location-aware device starts, terminates, or adjusts execution of a software program based on a result of the geo-fence monitoring. In an example, a location-aware device determines a current position of the device, such as information including latitude, longitude, altitude, and the like of the device, and compares the current position with a geo-fence to determine whether the location-aware device is inside or outside the geo-fenced area.

SUMMARY

Aspects of the disclosure provide a device. The device includes a first positioning circuit, a second positioning circuit, and a control circuit. The first positioning circuit is configured to determine a position of the device before becoming inactive. The second positioning circuit is configured to determine an estimated distance that the device travels relative to the position. The control circuit is configured to reactivate the first positioning circuit when the estimated distance exceeds a first predetermined threshold and a difference between a current wireless fingerprint and a previous wireless fingerprint exceeds a second predetermined threshold.

In an embodiment, the first positioning circuit is further configured to set a wakeup time to $\Delta D/V$, where $\Delta D$ is a distance from the position to a boundary of the geo-fenced area, and V is a detected speed of the device. In an embodiment, the first positioning circuit is further configured to set a wakeup time to $(\Delta D-W)/V$, when $\Delta D$ is greater than W, where $\Delta D$ is a distance from the position to a boundary of the geo-fenced area, W is a width of a buffer zone outside the geo-fenced area, and V is a detected speed of the device.

In an embodiment, the control circuit includes a wireless fingerprint detector, a wireless fingerprint storage, and a wireless fingerprint comparator. The wireless fingerprint detector is configured to obtain the current wireless fingerprint. The wireless fingerprint storage is configured to store the previous wireless fingerprint. The wireless fingerprint comparator is configured to determine whether the difference between the current wireless fingerprint and the previous wireless fingerprint exceeds the second predetermined threshold.

In an embodiment, the second positioning circuit includes at least one sensor and a sensor hub that is coupled with the at least one sensor. The at least one sensor includes an accelerometer, a gyroscope, a thermometer, or a barometer. The sensor hub is configured to determine the estimated distance based on an output of the at least one sensor.

Aspects of the disclosure provide a method. The method includes determining, by a first positioning circuit, a position of a device; and deactivating the first positioning circuit after determining the position. The method also includes determining, by a second positioning circuit, an estimated distance that the device travels relative to the position; and reactivating the first positioning circuit when the estimated distance exceeds a first predetermined threshold and a difference between a current wireless fingerprint and a previous wireless fingerprint exceeds a second predetermined threshold.

In an embodiment, the method further includes setting a wakeup time to $\Delta D/V$, where $\Delta D$ is a distance from the position to a boundary of the geo-fenced area, and V is a detected speed of the device. In an embodiment, the method further includes setting a wakeup time to $(\Delta D-W)/V$, when $\Delta D$ is greater than W, where $\Delta D$ is a distance from the position to a boundary of the geo-fenced area, W is a width of a buffer zone outside the geo-fenced area, and V is a detected speed of the device.

Aspects of the disclosure provide a device. The device includes at least one sensor, a sensor hub, a wireless fingerprint detector, a wireless fingerprint storage, and a wireless fingerprint comparator. The at least one sensor is configured to measure motion of the device. The sensor hub is coupled with the at least one sensor and configured to determine an estimated distance based on the measured motion of the device. The wireless fingerprint detector is configured to obtain a current wireless fingerprint when the estimated distance exceeds a first predetermined threshold. The wireless fingerprint storage is configured to store a previous wireless fingerprint. The wireless fingerprint comparator is configured to generate a wakeup signal when a difference between the current wireless fingerprint and the previous wireless fingerprint exceeds a predetermined threshold.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
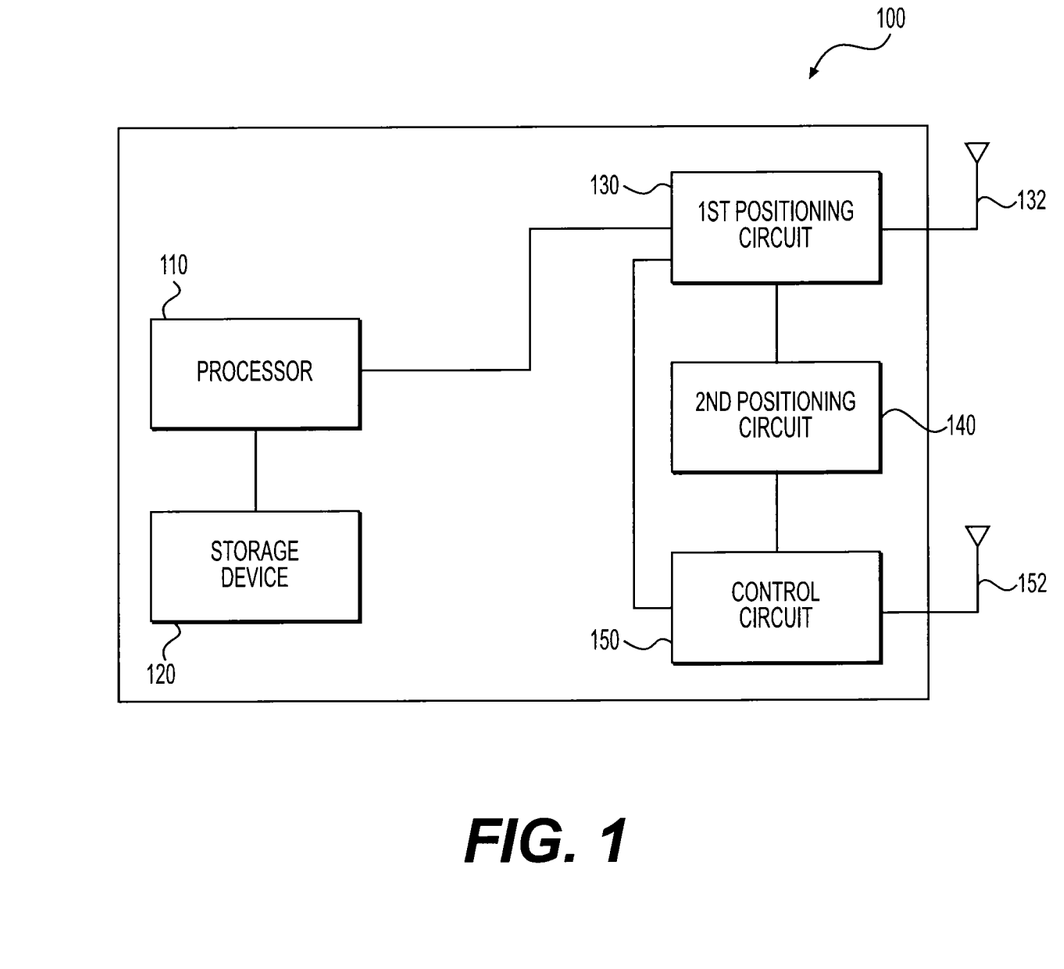
FIG. 1 shows a diagram of a location-aware device example 100 according to an embodiment of the disclosure.

FIG. 1 shows a diagram of a location-aware device example 100 according to an embodiment of the disclosure. In some embodiments, the location-aware device 100 is a mobile device, such as a tablet computer, a smart phone, a camera, a wearable device, or the like. In some embodiments, the location-aware device 100 is an RFID device, or the like.

The location-aware device 100 includes a processor 110, a storage device 120 electrically coupled with the processor 110, a first positioning circuit 130 electrically coupled with the processor 110, a second positioning circuit 140 electrically coupled with the first positioning circuit 130, and a control circuit 150 electrically coupled with the first positioning circuit 130 and the second positioning circuit 140. The location-aware device 100 also includes an antenna 132 electrically coupled with the first positioning circuit 130 and an antenna 152 electrically coupled with the control circuit 150. In some embodiments, the second positioning circuit 140 is electrically coupled with the processor 110. In some embodiments, the control circuit is electrically coupled with the processor 110.

The processor 110 includes a single processing core or multiple processing cores. The processor 110 is configured to execute an operation system and various client applications to perform various functions. In some embodiments, the processor 110 by executing instructions interacts with the first positioning circuit 130, where the determination regarding whether the device is entering or exiting a predetermined geo-fenced is made.

The storage device 120 is used to store an operation system, software programs, and/or other data or intermediate data for executing one or more of the software programs. In some embodiments, storage device 120 includes a non-transitory computer readable medium, such as a semiconductor or solid-state memory, a random access memory (RAM), a read-only memory (ROM), a hard disk, an optical disk, or other suitable storage medium. In some embodiments, storage device 120 includes a plurality of non-transitory computer readable mediums listed above.

The first positioning circuit 130 is configured to determine a current position of the device 100 and to determine whether the device 100 is entering or exiting a predetermined geo-fenced area. In some embodiments, the first positioning circuit 130 determines the position of the device 100 based on satellite signals received through the antenna 132. In some embodiments, the first positioning circuit 130 determines the position of the device 100 based on wireless base station signals received through the antenna 132 or through the control circuit 150 and the antenna 152. In some embodiments, the first positioning circuit 130 is inactive when the position and a relation between the position and the geo-fenced area are determined. In some embodiments, the first positioning circuit 130 is reactivated based on a wakeup time or by the control circuit 150. In some embodiments, the wakeup time corresponds to a time interval, and the first positioning circuit 130 is reactivated when the time interval has passed after the first positioning circuit 130 is inactivated.

The second positioning circuit 140 is configured to determine an estimated distance that the device 100 travels relative to the position determine by the first positioning circuit 130. In some embodiments, the second positioning circuit 140 includes at least one sensor such as an accelerometer, a gyroscope, a thermometer, or a barometer on which the estimated distance is calculated. In some embodiments, the first positioning circuit 130 causes the second positioning circuit 140 to determine the estimated distance before the first positioning circuit 130 is reactivated. In some embodiments, the second positioning circuit 140 notifies the control circuit 150 when the estimated distance exceeds a predetermined threshold distance. In some embodiments, the predetermined threshold distance is adjusted by the first positioning circuit 130 based on a distance between the current position to a boundary of the geo-fenced area.

The control circuit 150 is configured to obtain a current wireless fingerprint based on the wireless signals from wireless base stations that the control circuit 150 received through the antenna 152. The control circuit 150 is configured to store a previous wireless fingerprint and to compare the current wireless fingerprint with the previous wireless fingerprint. Also, the control circuit 150 is configured to reactivate the first positioning circuit 130 when a difference between the current wireless fingerprint and the previous wireless fingerprint exceeds a second predetermined threshold.

In some embodiments, compared with a configuration that the first positioning circuit 130 is periodically reactivated to perform the geo-fence monitoring, reactivating the first positioning circuit 130 using the second positioning circuit 140 and the control circuit 150 helps to avoid reactivating the first positioning circuit 130 when the device 100 remains at about the same position. In accordance with some embodiments of the present disclosure, the frequency that the more power-consuming (e.g., 50-100 milliamps) first positioning circuit 130 is turned on is adaptively adjusted based on less power-consuming (e.g., less than 10 milliamps) second positioning circuit 140 and the control circuit 150. As a result, the overall power consumption of the device 100 when performing the geo-fence monitoring is also reduced. The more accurate first positioning circuit 130 is still used to determine entering or exiting the predetermined geo-fenced area. Also, in some embodiments when the satellite signals used by the first positioning circuit 130 are temporarily obstructed, using the second positioning circuit 140 and the control circuit 150 helps to avoid activating the first positioning circuit 130 unnecessarily.

Figure 2:
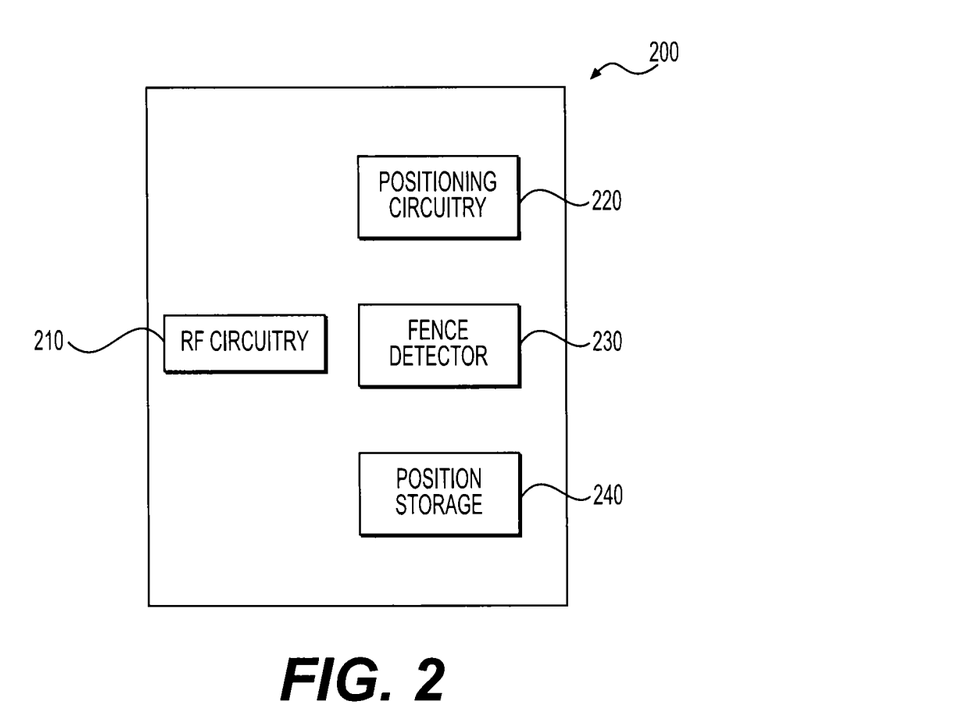
FIG. 2 shows a diagram of a positioning circuit example 200 according to an embodiment of the disclosure.
Figure 3:
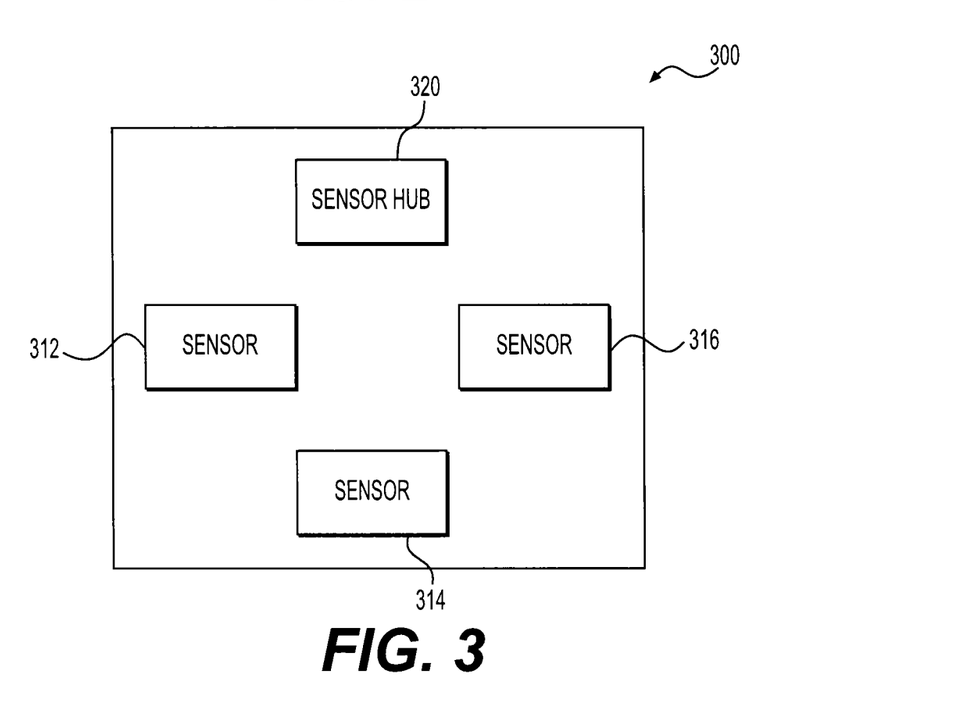
FIG. 3 shows a diagram of another positioning circuit example 300 according to an embodiment of the disclosure.
Figure 4:
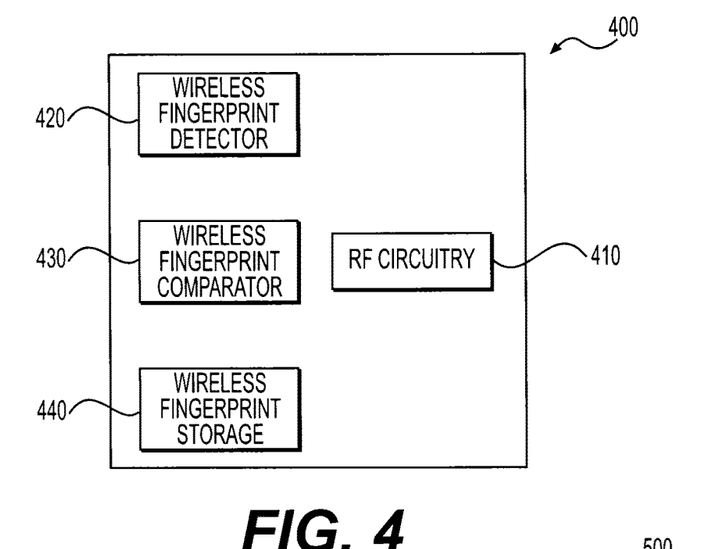
FIG. 4 shows a diagram of a control circuit example 400 according to an embodiment of the disclosure.

The configurations of the first positioning circuit 130, the second positioning circuit 140, and the control circuit 150 will be further described in conjunction with FIGS. 2-4. Detailed operations of the first positioning circuit 130, the second positioning circuit 140, and the control circuit 150 will be further described in conjunction with FIGS. 6-7 using a geo-fencing system 500 depicted in FIG. 5 as a non-limiting example.

FIG. 2 shows a diagram of a positioning circuit example 200 according to an embodiment of the disclosure. In some embodiments, the positioning circuit 200 is usable as the first positioning circuit 130 in FIG. 1.

The positioning circuit 200 includes radio frequency (RF) circuitry 210, positioning circuitry 220, a fence detector 230, and position storage 240. The RF circuitry 210 is coupled with the antenna 132 (FIG. 1) and is configured to receive wireless signals usable to determine a position of the location-aware device 100 in which the positioning circuit 200 is disposed. The positioning circuitry 220 is configured to determine a position based on wireless signals received by the RF circuitry 210. In some embodiments, the positioning circuitry 220 is also configured to determine a speed value, and/or a heading based on comparing a current position and a previous position, or based on measurement results from various sensors in the second positioning circuit 140. In some embodiments, the positioning circuitry 220 includes satellite-based positioning circuitry and/or wireless station-based circuitry.

The positioning circuitry 220 can determine a horizontal certainty of the determined current position. In some embodiments, the horizontal certainty of the current position is measurable as a radius, where more than 95% of the probability that an actual position falls within a circular area defined by the determined current position and the radius. Other approaches for measuring the horizontal certainty are within various contemplated embodiments.

In an embodiment, the RF circuitry 210 receives signals from satellites. Based on the received signals, the satellite-based positioning circuitry of the positioning circuitry 220 calculates distances from the device 100 to the satellites. Then, the distances to the satellites and the satellite location information are used to determine the position of the device 100. The satellite signals can be in compliance with a predetermined format of a satellite navigation system. In some embodiments, the satellite navigation system includes U.S. Global Positioning System (GPS), Russian Global Navigation Satellite System (GLONASS), EU Galileo system, Chinese BeiDou-2 System, or the like. In some embodiments, the positioning circuit 200 that is capable of determining a current position around the world based on one or more satellite navigation systems is also referred to as a global navigation satellite system (GNSS) circuit.

The RF circuitry 210 may receive signals from wireless stations. The wireless station-based circuitry of the positioning circuitry 220 measures the signal strengths from wireless stations. Based on the measurements, the wireless station-based circuitry of the positioning circuitry 220 calculates distances from the device 100 to the wireless stations. Then, the distances to the wireless stations and the wireless station location information are used to determine the position of the device 100. Additionally, the positioning circuitry 220 can receive wireless signals from wireless stations through another RF circuitry that is different from RF circuitry 210, such as RF circuitry 410 in FIG. 4.

The fence detector 230 is configured to perform the geo-fence monitoring functionality based on a current position determined by the positioning circuitry 220. In an embodiment, the geo-fence monitoring includes determining if the device 100 is within a predetermined geo-fence area and to notify processor 110 if the device 100 is moving in or out the predetermined geo-fence area. In some embodiments, the fence detector 230 is configured to set a wakeup time for the positioning circuit 200 and to deactivate the positioning circuit 200 after performing the geo-fence monitoring. In an embodiment, the fence detector 230 is also configured to instruct the second positioning circuit 140 to begin calculating an estimated distance the device 100 travels and/or to adjust the predetermined threshold distance.

The position storage 240 is configured to store information usable for facilitating the operations of the RF circuitry 210, the positioning circuitry 220, and/or the fence detector 230. In embodiments, the position storage 240 is configured to store intermediate data generated during the operations of the RF circuitry 210, the positioning circuitry 220, and/or the fence detector 230.

In an embodiment, the RF circuitry 210, the positioning circuitry 220, and the fence detector 230 are implemented as separate circuit blocks. In some embodiments, at least a portion of the RF circuitry 210, the positioning circuitry 220, and/or the fence detector 230 are implemented by a same circuit block. At least a portion of the RF circuitry 210, the positioning circuitry 220, and/or the fence detector 230 can be implemented by the processor 110 executing instructions stored in the storage device 120. In embodiments, the positioning circuit 200 includes a processor (not shown) configured to execute instructions stored in position storage 240 to implement at least a portion of the RF circuitry 210, the positioning circuitry 220, and/or the fence detector 230.

The position storage 240 and the storage device 120 (FIG. 1) can be implemented by a same memory circuit. In some embodiments, the position storage 240 and the storage device 120 (FIG. 1) are implemented by different memory circuits.

FIG. 3 shows a diagram of another positioning circuit example 300 according to an embodiment of the disclosure. The positioning circuit 300 can be usable as the second positioning circuit 140 in FIG. 1.

The positioning circuit 300 includes a plurality of sensors 312, 314, and 316 and a sensor hub 320. The plurality of sensors 312, 314, and 316 includes an accelerometer, a gyroscope, a thermometer, or a barometer, or other suitable sensors. The sensor hub 320 is electrically coupled with the plurality of sensors 312, 314, and 316 and is configured to determine an estimated distance based on one or more outputs of the plurality of sensors 312, 314, and 316.

In an embodiment, the sensor hub 320 is configured to determine a walking step count based on the measurement results output from the plurality of sensors 312, 314, and 316 as the estimated distance. The second positioning circuit 140 can be configured to calculate one or more estimated speed values based on the output of the sensors 312, 314, and 316, such as the accelerometer and/or the gyroscope, and to calculate the estimated distance based on the one or more estimated speed values. Furthermore, the sensor hub 320 is configured to notify the control circuit 150 (FIG. 1) when the estimated distance exceeds the predetermined threshold distance.

FIG. 4 shows a diagram of a control circuit example 400 according to an embodiment of the disclosure. In some embodiments, the control circuit 400 is usable as the control circuit 150 in FIG. 1.

The control circuit 400 includes RF circuitry 410, wireless fingerprint detector 420, wireless fingerprint comparator 430, and wireless fingerprint storage 440. The RF circuitry 410 is electrically coupled with the antenna 152 (FIG. 1) and is configured to receive wireless signals usable to determine a wireless fingerprint of the device 100. The wireless fingerprint detector 420 is configured to determine the wireless fingerprint based on wireless signals received by the RF circuitry 410.

In an embodiment, the wireless fingerprint of the device 100 includes information of wireless base stations detectable by the device 100. The information in the wireless fingerprint can include wireless station IDs and received signal intensities associated with wireless station IDs. In embodiments, the RF circuitry 410 and the wireless fingerprint detector 420 are capable of detecting wireless stations that are in compliance with one or more communication protocols, such as global system for mobile (GSM), code division multiple access (CDMA), wideband code division multiple access (WCDMA), time division synchronous code division multiple access (TD-SCDMA), long term evolution (LTE), time-division long term evolution (TD-LTE), Institute of Electrical and Electronics Engineers (IEEE) 802.11 based protocol (e.g., WiFi™ network), an IEEE 802.15 based protocol (e.g., Bluetooth™ network), and/or the like.

The wireless fingerprint comparator 430 is configured to determine a difference between a current wireless fingerprint and a previous wireless fingerprint, and to determine whether the difference between the current wireless fingerprint and the previous wireless fingerprint exceeds a predetermined threshold. The wireless fingerprint comparator 430 is configured to reactivate the first positioning circuit 130 when the difference between the current wireless fingerprint and the previous wireless fingerprint exceeds the predetermined threshold. In one example, the wireless fingerprint comparator 430 generates a wakeup signal and transmits the wakeup signal to the first positioning circuit 130 when the difference between the current wireless fingerprint and the previous wireless fingerprint exceeds the predetermined threshold. The wireless fingerprint comparator 430 is also configured to instruct the second positioning circuit 140 to recalculate an estimated distance the device 100 travels when the difference between the current wireless fingerprint and the previous wireless fingerprint does not exceed the predetermined threshold.

In some embodiments, when the difference between the current wireless fingerprint and the previous wireless fingerprint does not exceed the predetermined threshold, the device 100 is deemed to be around the determined current position. On the other hand, when the difference between the current wireless fingerprint and the previous wireless fingerprint exceeds the predetermined threshold, the device 100 is sufficiently away from the determined current position to justify reactivate the first positioning circuit 130 to update position information.

In some embodiments, the wireless fingerprint comparator 430 is configured to determine whether the difference between the current wireless fingerprint and the previous wireless fingerprint exceeds the predetermined threshold by determining a number of wireless station IDs that are present in the current wireless fingerprint and the previous wireless fingerprint (i.e., repeated wireless station IDs). In an embodiment, when a ratio of the number of repeated wireless station IDs to a total number of wireless station IDs in the current wireless signal is less than a predetermined ratio, it is determined that the difference between the current wireless fingerprint and the previous wireless fingerprint exceeds the predetermined threshold.

In embodiments, the wireless fingerprint comparator 430 is configured to determine whether the difference between the current wireless fingerprint and the previous wireless fingerprint exceeds the predetermined threshold by determining a first weighted summation of received signal intensities in the current wireless fingerprint associated with the repeated wireless station IDs and determining a second weighted summation of received signal intensities in the previous wireless fingerprint associated with the repeated wireless station IDs. In some embodiments, when a ratio of a difference between the first weighted summation and the second weighted summation to the first weighted summation exceeds a predetermined ratio, it is determined that the difference between the current wireless fingerprint and the previous wireless fingerprint exceeds the predetermined threshold.

In some embodiments, the weights for calculating the first and second weighted summations are set to be inversely proportional to a ranking of the received signal intensities in the current wireless fingerprint. In an embodiment, the weights for calculating the first and second weighted summations are set to be proportional to the received signal intensities in the current wireless fingerprint.

Other approaches to determine whether the difference between the current wireless fingerprint and the previous wireless fingerprint justify reactivating the first positioning circuit 130 is within various contemplated embodiments.

The wireless fingerprint storage 440 is configured to store information usable for facilitating the operations of the RF circuitry 410, the wireless fingerprint detector 420, and/or the wireless fingerprint comparator 430. The wireless fingerprint storage 440 can be configured to store intermediate data generated during the operations of the RF circuitry 410, the wireless fingerprint detector 420, and/or the wireless fingerprint comparator 430.

The RF circuitry 410, the wireless fingerprint detector 420, and the wireless fingerprint comparator 430 can be implemented as separate circuit blocks. In some embodiments, at least a portion of the RF circuitry 410, the wireless fingerprint detector 420, and/or the wireless fingerprint comparator 430 are implemented by a same circuit block. In some embodiments, at least a portion of the RF circuitry 410, the wireless fingerprint detector 420, and/or the wireless fingerprint comparator 430 are implemented by the processor 110 execute instructions stored in the storage device 120. The control circuit 400 can include a processor (not shown) configured to execute instructions stored in the wireless fingerprint storage 440 to implement at least a portion of the RF circuitry 410, the wireless fingerprint detector 420, and/or the wireless fingerprint comparator 430.

The wireless fingerprint storage 440 and the storage device 120 (FIG. 1) can be implemented by a same memory circuit. In some embodiments, wireless fingerprint storage 440 and the storage device 120 (FIG. 1) are implemented by different memory circuits.

Figure 5:
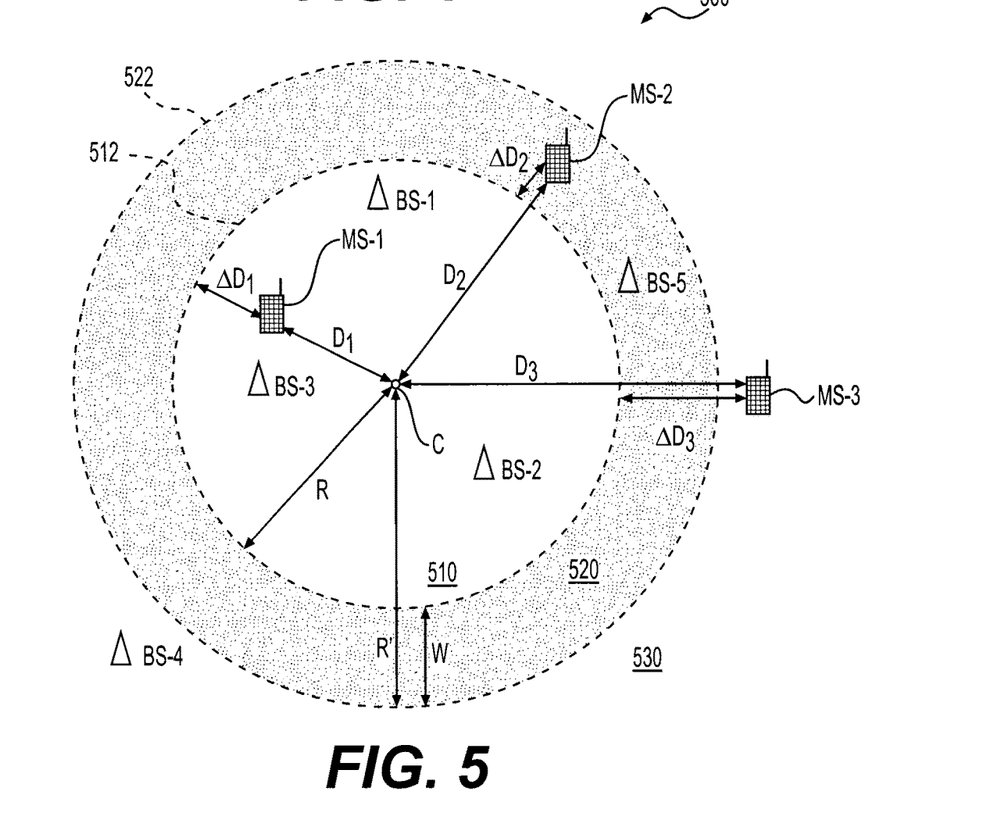
FIG. 5 shows a diagram of a geo-fencing system example 500 according to an embodiment of the disclosure.

FIG. 5 shows a diagram of a geo-fencing system example 500 according to an embodiment of the disclosure. The geo-fencing system 500 is usable to facilitate the illustration of the flow charts in FIGS. 6 and 7.

The geo-fencing system 500 has a predetermined geo-fenced area 510, a buffer zone 520 outside the geo-fenced area 510, and an outer area 530 further away from the geo-fenced area 510. The geo-fencing system 500 includes a plurality of wireless stations BS-1, BS-2, BS-3, BS-4, and BS-5 and a plurality of mobile devices MS-1, MS-2, and MS-3 disposed in various positions in the predetermined geo-fenced area 510, the buffer zone 520, or the outer area 530.

The predetermined geo-fenced area 510 in FIG. 5 is defined by a geographic center C and a radius R. A boundary 512 of the geo-fenced area 510, which is also referred to as a geo-fence of the geo-fenced area 510 in the present disclosure, has a circular shape around center C. If a mobile device, such as the mobile device MS-1, has a distance $D_1$ to the center C equal to or less than the radius R, the mobile device MS-1 is within the geo-fenced area 510. Of course, the boundary 512 of the geo-fenced area 510 does not have to be circular and can be any other shape other than a circular shape. For example, the boundary 512 of the geo-fenced area 510 can be a polygon shape that is defined by segments of lines. It should be understood that numerous other applicable approaches to define the geo-fenced area 510 and to determine whether the mobile device MS-1 is within the geo-fenced area 510 are among the various embodiments of the present disclosure.

The buffer zone 520 in FIG. 5 is defined by the geographic center C of the geo-fenced area 510 and a radius R', where a difference between R' and R is a width W of the buffer zone. In some embodiments, R' ranges from 1.2 to 1.8 times R. A boundary 522 of the buffer zone 520 also has a circular shape around center C. If a mobile device, such as the mobile device MS-2 has a distance $D_2$ to the center C greater than the radius R and equal or less than the radius R', the mobile device MS-2 is within the buffer zone 520. As with the boundary 512 of the geo-fenced area 510 above, the boundary 522 of the buffer zone 520 can have a shape other than a circular shape, such as a polygon shape is defined by segments of lines. Further, the buffer zone 520 may have various widths W corresponding to different portions of the geo-fence (boundary 512). Other applicable approaches to define the buffer zone 520 and to determine whether the mobile device MS-2 is within the buffer zone 520 are among the various embodiments of the present disclosure.

As shown in FIG. 5, any mobile device, such as mobile device MS-3, that has a distance $D_3$ to the center C greater than the radius R' is deemed to be within the outer area 530. Other applicable approaches to define the outer area 530 and to determine whether the mobile device MS-3 is within the outer area 530 are among the various embodiments of the present disclosure.

In some embodiments, the plurality of wireless stations BS-1, BS-2, BS-3, BS-4, and BS-5 are configured to communicate with the plurality of mobile devices MS-1, MS-2, and MS-3 according to one or more of various communication protocols, such as GSM, CDMA, WCDMA, TD-SCDMA, LTE, TD-LTE; IEEE 802.11 based protocol, IEEE 802.15 based protocol, and the like.

Figure 6:
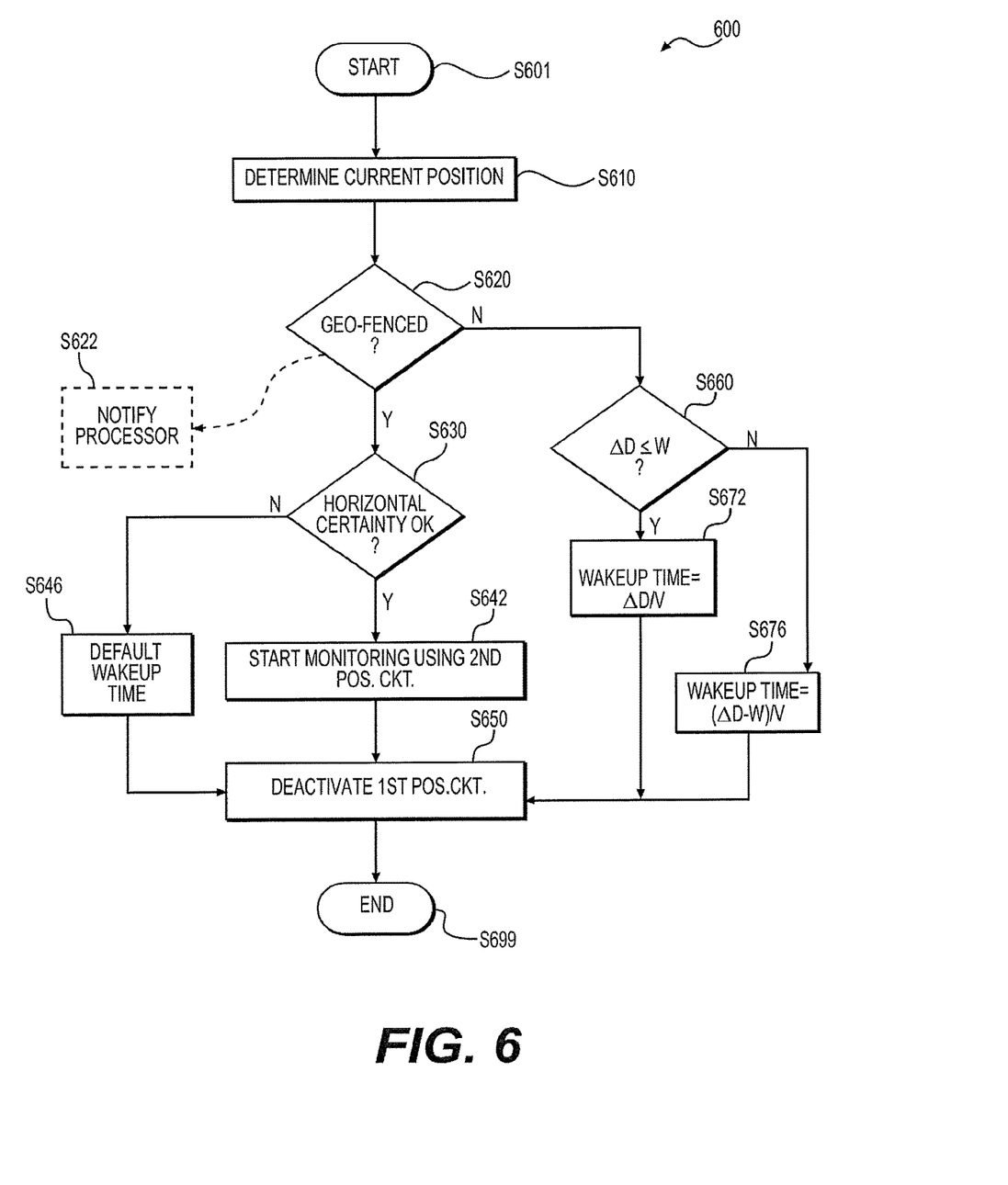
FIG. 6 shows a flow chart outlining a process example 600 according to an embodiment of the disclosure.

FIG. 6 shows a flow chart outlining a process example 600 according to an embodiment of the disclosure. In an example, the process 600 is performed by the first positioning circuit 200 in FIG. 2 or the first positioning circuit 130 in FIG. 1. The process 600 starts at S601 and proceeds to S610.

At S610, the positioning circuitry 220 of the first positioning circuit 200 determines a position of a location-aware device, such as device 100, in which the positioning circuit 200 is disposed. The positioning circuitry 220 also determines a horizontal certainty of the determined position, a current speed value, and a current heading. In an embodiment, the current speed is a magnitude of a velocity vector of the device 100 regardless the current heading. In an embodiment, the current speed refers to a magnitude of a component vector of the velocity vector along a direction perpendicular to the closet boundary, such as boundary 512 in FIG. 5, of a predetermined geo-fenced area 510.

At S620, the fence detector 230 of the first positioning circuit 200 determines whether the current position is within the predetermined geo-fenced area. If fence detector 230 determines that the device 100 is within the predetermined geo-fenced area, the process proceeds to S630. If fence detector 230 determines that the device 100 is outside the predetermined geo-fenced area, the process proceeds to S660.

At S620, the fence detector 230 also compares the current position against the previous position and determines whether the device 100 moves into or out of the predetermined geo-fenced area. If the fence detector 230 determines that the device 100 just moves into or out of the predetermined geo-fenced area 510, the process proceeds to S622, where the fence detector 230 notify the processor 110 that the device 100 is moving across the boundary 512. In some embodiments, fence detector 230 determines whether the device 100 is within the predetermined geo-fenced area 510 based on whether a distance between the current position of the device 100 to a center C of the predetermined geo-fenced area 510 is equal to or less than a radius R of the predetermined geo-fenced area 510.

For example, in FIG. 5, mobile device MS-1 has a distance $D_1$ to the center C of the predetermined geo-fenced area 510, where distance $D_1$ is less than the radius R. Therefore, mobile device MS-1 is determined as within the predetermined geo-fenced area 510. Mobile device MS-2 has a distance $D_2$ to the center C, and mobile device MS-3 has a distance $D_3$ to the center C, where distance $D_2$ and distance $D_3$ are greater than the radius R. Therefore, mobile device MS-2 and MS-3 are determined as outside the predetermined geo-fenced are 510.

In some embodiments, S630 is omitted, and the process proceeds from S620 to S642. In some embodiments, S660 is omitted, and the process proceeds from S620 to S672.

At S630, the fence detector 230 determined if the horizontal certainty of the current position is acceptable. In some embodiments, if the horizontal certainty is equal to or less than the radius R of the predetermined geo-fenced area 510, the horizontal certainty is determined as acceptable; and if the horizontal certainty is greater than the radius R of the predetermined geo-fenced area 510, the horizontal certainty is determined as unacceptable. If the fence detector 230 determines that the horizontal certainty is acceptable, the process proceeds to S642; and if the fence detector 230 determines that the horizontal certainty is unacceptable, the process proceeds to S646.

At S642, the fence detector 230 instructs the second positioning circuit 140 to start monitoring an estimated distance the device 100 travels after the current position is determined. The second positioning circuit 140 will work with the control circuit 150 to determine when to reactivate the first positioning circuit 200. The second positioning circuit 140 calculates an estimated distance the device 100 travels relative to the current position. The second positioning circuit 140 also notifies the control circuit 150 when the estimated distance exceeds a predetermined threshold distance. The operations of the second positioning circuit 140 and the control circuit 150 are further illustrated in conjunction with FIG. 7.

In embodiments, the fence detector 230 adjusts the predetermined threshold distance for the second positioning circuit 140. The fence detector 230 can determine the predetermined threshold distance based on a distance from the current position to the boundary 512, such as distance $\Delta D_1$ from mobile device MS-1 to the boundary 512. In some embodiments, the predetermined threshold distance is set to be the distance from the current position to the boundary 512, such as the distance $\Delta D_1$.

Without waiting for the operations of the second positioning circuit 140 and/or the control circuit 150, the process proceeds to S650.

At S646, the fence detector 230 sets a default wakeup time as the wakeup time. In some embodiments, the default wakeup time ranges from 0.5 second to 2 seconds. After S646, the process proceeds to S650.

At S650, the fence detector 230 deactivates the first positioning circuit 200.

At S660, the fence detector 230 determined if the current position of the device 100 is within the buffer zone 520 or the outer area 530. If a distance $\Delta D$ between the device 100 to the boundary 512 of the predetermined geo-fenced area 510 is equal to or less than the width W of the buffer zone 520, the device 100 is within the buffer zone 520, and the process proceeds to S672. If the distance ΔD between the device 100 to the boundary 512 of the predetermined geo-fenced area 510 is greater than the width W, the device 100 is within the outer area 530, and the process proceeds to S676.

For example, in FIG. 5, the mobile device MS-2 has a distance $\Delta D_2$ to the boundary 512, where distance $\Delta D_2$ is less than the width W. Therefore, mobile device MS-2 is determined as within the buffer zone 520. The mobile device MS-3 has a distance $\Delta D_3$ to the boundary 512, where distance $\Delta D_3$ is greater than the width W. Therefore, mobile device MS-3 is determined as within the outer area 530.

At S672, the fence detector 230 sets the wakeup time based on the following equation:

$$\text{Wakeup time} = \Delta D/V, \quad (1)$$

where ΔD is a distance from the current position to the boundary 512 of the geo-fenced area 510, and V is a detected speed of the device 100.

In some embodiments, the distance ΔD is measurable as (D–R), and equation (1) is rewritten as:

$$\text{Wakeup time} = (D-R)/V. \quad (2)$$

In the FIG. 5 example, for the mobile device MS-2, the wakeup time will be set as $\Delta D_2/V_2$, where $V_2$ is the speed of the mobile device MS-2.

In some embodiments, at S672, if the horizontal certainly of the current position is greater than distance ΔD, instead of using equation (1) or equation (2), the fence detector 230 sets the default wakeup time as the wakeup time.

In some embodiments, at S672, if the calculated wakeup time is greater than a predetermined maximum wakeup time interval, the wakeup time is set to be predetermined maximum wakeup time interval.

After S672, the process proceeds to S650.

At S676, the fence detector 230 sets the wakeup time based on the following equation:

$$\text{Wakeup time} = (\Delta D - W)/V, \quad (3)$$

where ΔD is a distance from the current position to the boundary 512 of the geo-fenced area 510, W is the width of the buffer zone 520, and V is a detected speed of the device 100.

In some embodiments, the width W is measurable as (R'–R), and equation (3) is rewritten as:

$$\text{Wakeup time} = (D-R')/V. \quad (4)$$

In the FIG. 5 example, for the mobile device MS-3, the wakeup time will be set as $(\Delta D_3-W)/V_3$, where $V_3$ is the speed of the mobile device MS-3.

In some embodiments, at S676, if the calculated wakeup time is greater than a predetermined maximum wakeup time interval, the wakeup time is set to be predetermined maximum wakeup time interval.

After S676, the process proceeds to S650.

After S650, the process proceeds to S699 and terminates. The first positioning circuit 200 will be reactivated when the wakeup time set according to method 600 is up after first positioning circuit 200 is deactivated.

Figure 7:
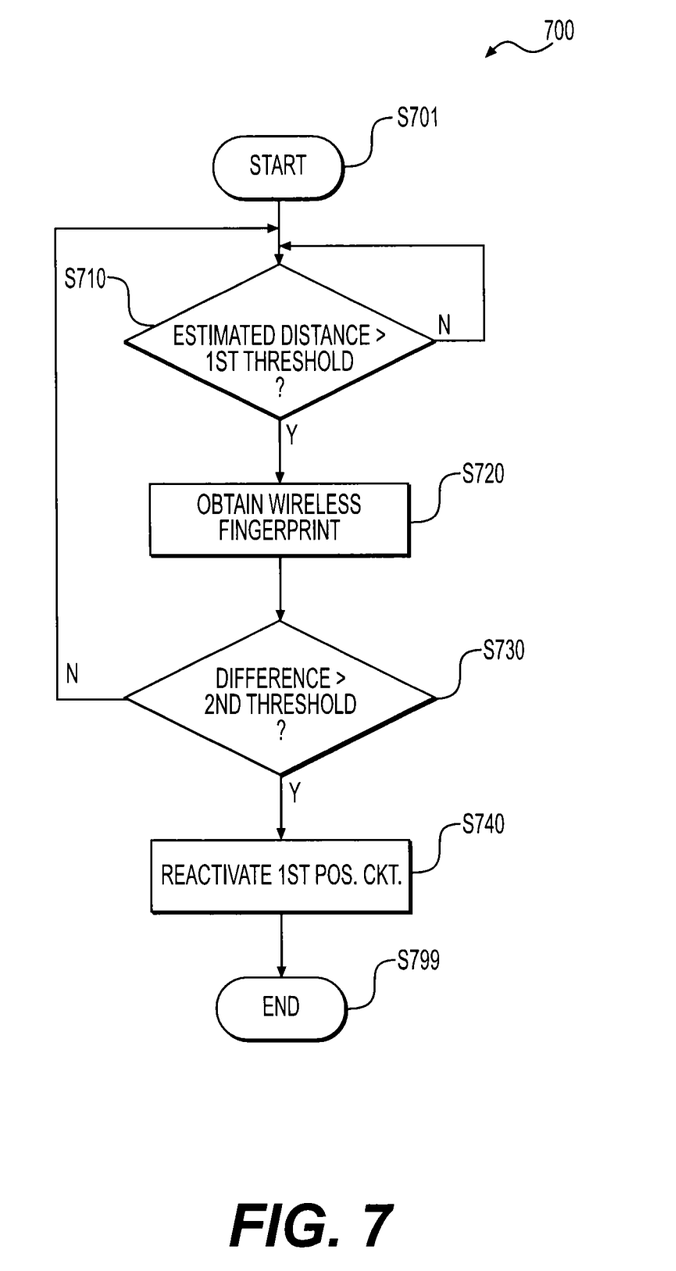
FIG. 7 shows a flow chart outlining a process example 700 according to an embodiment of the disclosure.

FIG. 7 shows a flow chart outlining a process example 700 according to an embodiment of the disclosure. In an example, the process 700 is performed by the second positioning circuit 140 and the control circuit 150 in FIG. 1. The process 700 starts at S701 and proceeds to S710.

At S710, the second positioning circuit 140 calculate an estimated distance the device 100 travels relative to the current position. The second positioning circuit 140 can determine a walking step count as the estimated distance based on measuring the motion of the device. In an embodiment, the second positioning circuit 140 calculates one or more estimated speed values based on sensor outputs, and calculates the estimated distance based on the one or more estimated speed values.

At S710, the second positioning circuit 140 also determines whether the estimated distance is greater than a predetermined threshold distance. If the estimated distance is greater than the predetermined threshold distance, the process proceeds to S720; otherwise, the process stays at S710. In some embodiments, the predetermined threshold distance is set to the radius R of the predetermined geo-fenced area 510. In some embodiments, the predetermined threshold distance is adjustable based on a distance from the current position to the boundary 512 of the predetermined geo-fenced area 510. In the FIG. 5 example, for the mobile device MS-1, the predetermined threshold distance is set to the radius R or adjustable based on the distance $\Delta D_1$.

At S720, the control circuit 150 obtains a current wireless fingerprint of the device 100. The current wireless fingerprint is recorded in the storage and may be used as the previous wireless fingerprint next time process 700 is performed. In some examples, the control circuit 150 may obtain a wireless fingerprint corresponding to wireless signals received by the device 100 about the time the first positioning circuit 200 becomes inactive as the previous wireless fingerprint.

In the FIG. 5 example, for the mobile device MS-1, the control circuit 150 receives wireless signals from the wireless stations BS-1, BS-2, BS-3, and BS-4. In an embodiment, the mobile device MS-1 lists the wireless station IDs of the wireless stations BS-1, BS-2, BS-3, and BS-4 and the corresponding received signal intensities. In this example, the received signal intensity of the signal from the base station BS-5 is insufficient to allow the wireless station BS-5 to be recognized by the mobile device MS-1.

At S730, the control circuit 150 compares obtains the current wireless fingerprint of the device 100 and a previous wireless fingerprint stored in the control circuit 150. If the control circuit 150 determines that a difference between a current wireless fingerprint and the previous wireless fingerprint exceeds a second predetermined threshold, the process proceeds to S740; otherwise, the control circuit 150 resets the second positioning circuit 140 and the process returns to S710.

In the FIG. 5 example, for the mobile device MS-1, a previous wireless fingerprint is recorded in the storage, such as the fingerprint storage 440 in control circuit 400. The control circuit 150 compares the current wireless fingerprint and the previous wireless fingerprint in order to determine if the difference between the current wireless fingerprint and the previous wireless fingerprint indicates that the mobile device MS-1 is away from the current position and reactivating the first positioning device 130 is thus justified.

In an example, the previous wireless fingerprint includes the wireless station IDs of the wireless stations BS-1, BS-2, BS-3, and BS-5 and the corresponding received signal intensities. Three out of four listed base stations in the current wireless fingerprint are repeated base stations. If the predetermined threshold corresponds to 30% of different base station IDs, the control circuit will consider that the difference does not exceed the predetermined threshold. If the predetermined threshold corresponds to 20% of different base station IDs, the control circuit will consider that the difference exceeds the predetermined threshold.

In another example, the previous wireless fingerprint includes the wireless station IDs of the wireless stations BS-1, BS-2, BS-3, and BS-4 and the corresponding received signal intensities. Therefore, all listed base stations in the current wireless fingerprint are repeated base stations. However, the mobile station MS-1 may be closer to base station BS-1 when the previous wireless fingerprint is generated and closer to base station BS-3 when the current wireless fingerprint is generated. As such, for example, a weighted summation of received signal intensities in the current wireless fingerprint is 100 and a weighted summation of received signal intensities in the previous wireless fingerprint is 75. Using the current weighted summation as a base, the difference in weighted summations is 25%. If the predetermined threshold corresponds to 30% difference in weighted summations, the control circuit will consider that the difference does not exceed the predetermined threshold. If the predetermined threshold corresponds to 20% difference in weighted summations, the control circuit will consider that the difference exceeds the predetermined threshold.

At S740, the control circuit 150 reactivates the first positioning circuit 130. After S740, the process proceeds to S799 and terminates.

The process 600 and process 700 are illustrated based on the geo-fencing system 500 depicted in FIG. 5 as a non-limiting example. In some embodiments, the process 600 and process 700 are applicable in a geo-fencing system having a configuration different from that of the geo-fencing system 500.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A device, comprising:
a first positioning circuit that is configured to determine a position of the device before the device becomes inactive;
a second positioning circuit that is configured to determine an estimated distance that the device travels relative to the position; and
a control circuit that is configured to i) obtain a current wireless fingerprint of the device when the estimated distance exceeds a first predetermined threshold and ii) reactivate the first positioning circuit when a difference between the current wireless fingerprint and a previous wireless fingerprint of the device exceeds a second predetermined threshold,
wherein the difference between the current wireless fingerprint and the previous wireless fingerprint is measurable based on i) a number of repeated wireless station ID(s) that are present in the current wireless fingerprint and the previous wireless fingerprint, or ii) received signal intensities in the current wireless fingerprint and the previous wireless fingerprint that are associated with the repeated wireless station ID(s).

2. The device of claim 1, wherein the first positioning circuit is further configured to:
determine whether the position is within a predetermined geo-fenced area.

3. The device of claim 2, wherein the first positioning circuit is further configured to:
set a wakeup time of the first positioning circuit based on a detected speed of the device when the position of the device is outside the predetermined geo-fenced area.

4. The device of claim 3, wherein the first positioning circuit is further configured to:
set the wakeup time to ΔD/V, where ΔD is a distance from the position to a boundary of the geo-fenced area, and V is the detected speed of the device.

5. The device of claim 3, wherein the first positioning circuit is further configured to:
set the wakeup time to (ΔD−W)/V, when ΔD is greater than W, where ΔD is a distance from the position to a boundary of the geo-fenced area, W is a width of a buffer zone outside the geo-fenced area, and V is the detected speed of the device.

6. The device of claim 1, wherein the first positioning circuit is further configured to:
set a wakeup time of the first positioning circuit based on a predetermined time interval when a horizontal certainty level of the position exceeds a predetermined certainty level.

7. The device of claim 1, wherein the control circuit comprises:
a wireless fingerprint detector that is configured to obtain the current wireless fingerprint;
a wireless fingerprint storage that is configured to store the previous wireless fingerprint; and
a wireless fingerprint comparator that is configured to determine whether the difference between the current wireless fingerprint and the previous wireless fingerprint exceeds the second predetermined threshold.

8. The device of claim 7, wherein the wireless fingerprint comparator is configured to determine whether the difference between the current wireless fingerprint and the previous wireless fingerprint exceeds the second predetermined threshold by:
determining the number of the repeated wireless station IDs that are present in the current wireless fingerprint and the previous wireless fingerprint.

9. The device of claim 7, wherein the wireless fingerprint comparator is configured to determine whether the difference between the current wireless fingerprint and the previous wireless fingerprint exceeds the second predetermined threshold by:
determining a first weighted summation of the received signal intensities in the current wireless fingerprint associated with the repeated wireless station IDs that are present in the current wireless fingerprint and the previous wireless fingerprint; and
determining a second weighted summation of the received signal intensities in the previous wireless fingerprint associated with the repeated wireless station IDs that are present in the current wireless fingerprint and the previous wireless fingerprint.

10. The device of claim 1, wherein the second positioning circuit comprises:
at least one sensor including an accelerometer, a gyroscope, a thermometer, or a barometer; and
a sensor hub that is coupled with the at least one sensor and configured to determine the estimated distance based on an output of the at least one sensor.

11. The device of claim 10, wherein the sensor hub is configured to determine a walking step count as the estimated distance.

12. A method, comprising:
   determining, by a first positioning circuit, a position of a device;
   deactivating the first positioning circuit after determining the position;
   determining, by a second positioning circuit, an estimated distance that the device travels relative to the position;
   obtaining a current wireless fingerprint of the device when the estimated distance exceeds a first predetermined threshold; and
   reactivating the first positioning circuit when a difference between the current wireless fingerprint and a previous wireless fingerprint of the device exceeds a second predetermined threshold,
   wherein the difference between the current wireless fingerprint and the previous wireless fingerprint is measurable based on i) a number of repeated wireless station ID(s) that are present in the current wireless fingerprint and the previous wireless fingerprint, or ii) received signal intensities in the current wireless fingerprint and the previous wireless fingerprint that are associated with the repeated wireless station ID(s).

13. The method of claim 12, further comprising:
   determining, by a first positioning circuit, whether the position is within a predetermined geo-fenced area.

14. The method of claim 13, further comprising:
   setting a wakeup time of the first positioning circuit based on a detected speed of the device when the position of the device is outside the predetermined geo-fenced area.

15. The method of claim 14, wherein setting the wakeup time comprises:
   setting the wakeup time to $\Delta D/V$, where $\Delta D$ is a distance from the position to a boundary of the geo-fenced area, and V is the detected speed of the device.

16. The method of claim 14, wherein setting the wakeup time comprises:
   setting the wakeup time to $(\Delta D-W)/V$, when $\Delta D$ is greater than W, where $\Delta D$ is a distance from the position to a boundary of the geo-fenced area, W is a width of a buffer zone outside the geo-fenced area, and V is the detected speed of the device.

17. The method of claim 12, further comprising:
   setting a wakeup time of the first positioning circuit based on a predetermined time interval when a horizontal certainty level of the position exceeds a predetermined certainty level.

18. The method of claim 12, wherein determining whether the difference between the current wireless fingerprint and the previous wireless fingerprint exceeds the second predetermined threshold comprises:
   determining the number of the repeated wireless station IDs that are present in the current wireless fingerprint and the previous wireless fingerprint.

19. The method of claim 12, wherein determining whether the difference between the current wireless fingerprint and the previous wireless fingerprint exceeds the second predetermined threshold comprises:
   determining a first weighted summation of the received signal intensities in the current wireless fingerprint associated with the repeated wireless station IDs that are present in the current wireless fingerprint and the previous wireless fingerprint; and
   determining a second weighted summation of the received signal intensities in the previous wireless fingerprint associated with the repeated wireless station IDs that are present in the current wireless fingerprint and the previous wireless fingerprint.

20. A device, comprising:
   at least one sensor that is configured to measure motion of the device;
   a sensor hub that is coupled with the at least one sensor and configured to determine an estimated distance based on the measured motion of the device;
   a wireless fingerprint detector that is configured to obtain a current wireless fingerprint of the device when the estimated distance exceeds a first predetermined threshold;
   a wireless fingerprint storage that is configured to store a previous wireless fingerprint of the device; and
   a wireless fingerprint comparator that is configured to generate a wakeup signal when a difference between the current wireless fingerprint and the previous wireless fingerprint of the device exceeds a second predetermined threshold,
   wherein the difference between the current wireless fingerprint and the previous wireless fingerprint is measurable based on i) a number of repeated wireless station ID(s) that are present in the current wireless fingerprint and the previous wireless fingerprint, or ii) received signal intensities in the current wireless fingerprint and the previous wireless fingerprint that are associated with the repeated wireless station ID(s).

* * * * *